(12) United States Patent
Segerstrom

(10) Patent No.: US 10,808,923 B2
(45) Date of Patent: Oct. 20, 2020

(54) MULTI-STAGE DUCT FIRED HEAT RECOVERY STEAM GENERATOR AND METHODS OF USE

(71) Applicant: Chevron U.S.A. Inc., San Ramon, CA (US)

(72) Inventor: John A. Segerstrom, Ventura, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 205 days.

(21) Appl. No.: 16/142,983

(22) Filed: Sep. 26, 2018

(65) Prior Publication Data

US 2019/0024883 A1 Jan. 24, 2019

Related U.S. Application Data

(63) Continuation-in-part of application No. 14/740,355, filed on Jun. 16, 2015, now abandoned.

(60) Provisional application No. 62/012,493, filed on Jun. 16, 2014.

(51) Int. Cl.
| | |
|---|---|
| *F22B 1/18* | (2006.01) |
| *F01K 23/10* | (2006.01) |
| *F02C 6/18* | (2006.01) |

(52) U.S. Cl.
CPC ............ *F22B 1/1815* (2013.01); *F01K 23/10* (2013.01); *F01K 23/103* (2013.01); *F02C 6/18* (2013.01); *F05D 2220/72* (2013.01); *Y02E 20/14* (2013.01)

(58) Field of Classification Search
CPC ...... F22B 1/1815; F01K 23/10; F01K 23/103; F02C 6/18; F05D 2220/72; Y02E 20/14

USPC ................. 122/7 R, 461, 466, 468
See application file for complete search history.

(56) References Cited

U.S. PATENT DOCUMENTS

| | | | |
|---|---|---|---|
| 3,830,620 A | 8/1974 | Martin | |
| 3,843,309 A | 10/1974 | Lambiris | |
| 5,558,047 A * | 9/1996 | Vetterick | F22B 1/1815 |
| | | | 122/235.11 |

(Continued)

OTHER PUBLICATIONS

Ameri, Mohammad, et al.; "The CFD Modeling of Heat Recovery Steam Generator Inlet Duct"; (Jun. 2013), International Journal of Energy Engineering )IJEE), vol. 3, Issue 3, pp. 74-79.

(Continued)

*Primary Examiner* — Steven B McAllister
*Assistant Examiner* — Benjamin W Johnson

(57) ABSTRACT

A high efficiency multi-stage duct fired heat recovery steam generator (HRSG) is provided to generate steam for use in thermal enhanced oil recovery (EOR) applications. The HRSG is equipped with a plurality of duct burners in series and a plurality of evaporators for transferring heat from the duct burners to the water to generate steam, with at least one evaporator corresponding to each of the duct burners. Each evaporator is arranged downstream from the corresponding duct burner. At least one perforated plate is configured to disperse and distribute available oxygen within a subsequent duct burner. Hot exhaust gas from a gas turbine (over 1000° F.) is directed to the duct burners in series, allowing further combustion and maximizing thermal efficiency for the HRSG to have a thermal efficiency of at least 92%, and for the exhaust gas exiting the HRSG to contain oxygen in a range of 2% to 8%.

20 Claims, 2 Drawing Sheets

(56) References Cited

U.S. PATENT DOCUMENTS

| | | | | |
|---|---|---|---|---|
| 5,626,103 | A * | 5/1997 | Haws | F01K 17/025 |
| | | | | 122/235.14 |
| 6,230,480 | B1 * | 5/2001 | Rollins, III | F01K 23/105 |
| | | | | 60/39.182 |
| 6,453,852 | B1 | 9/2002 | Lifshits et al. | |
| 2001/0042381 | A1 * | 11/2001 | Dodo | F25B 27/02 |
| | | | | 122/235.11 |
| 2014/0099591 | A1 | 4/2014 | Polonsky | |
| 2015/0361850 | A1 * | 12/2015 | Forwerck | F23J 15/003 |
| | | | | 60/783 |

OTHER PUBLICATIONS

Vytla, Veera Venkata Sunil Kumar; "CFD Modeling of Heat Recovery Steam Generator and its Components Using Fluent"; (2005), University of Kentucky Master's Thesis; Cover pages—p. 40.

Vytla, Veera Venkata Sunil Kumar; "CFD Modeling of Heat Recovery Steam Generator and its Components Using Fluent"; (2005), University of Kentucky Master's Thesis, pp. 41-101.

Vytla, Veera Venkata Sunil Kumar; "CFD Modeling of Heat Recovery Steam Generator and its Components Using Fluent"; (2005), University of Kentucky Master's Thesis, pp. 102-164.

* cited by examiner

MULTI-STAGE DUCT FIRED HEAT RECOVERY STEAM GENERATOR AND METHODS OF USE

CROSS REFERENCE TO RELATED APPLICATION

This application claims benefit under 35 USC 119 of U.S. Provisional Patent Application No. 62/012,493 with a filing date of Jun. 16, 2014. This application claims priority to and benefits from the foregoing, the disclosure of which is incorporated herein by reference. The present application also claims priority as a continuation-in-part application from U.S. application Ser. No. 14/740,355, filed on Jun. 16, 2015, which is incorporated by reference.

FIELD

One or more embodiments relate to, for example, a multi-stage/high temperature duct fired heat recovery steam generator and related methods thereof.

BACKGROUND

A heat recovery steam generator or HRSG is a heat exchange apparatus that recovers heat from a hot gas stream to produce steam. The hot gas stream can be provided, for example, by the hot exhaust from a gas turbine. Gas turbines with no heat-recovery steam generators (HRSGs) are approximately 35 to 40% thermally efficient. Gas turbines with non-fired heat-recovery steam generators (HRSGs) are approximately 75 to 80% thermally efficient, wherein the HRSGs generate steam utilizing the energy in the gas turbine exhaust, the quality and quantity of which depend on flow characteristics and temperature of the exhaust gas. Typical gas turbine exhaust contains 13-15% oxygen by volume.

Prior art gas turbines with a single stage of duct firing (duct burner or supplemental burner) are approximately 80 to 85% thermally efficient, because any fuel added to duct firing the HRSG is 100% thermally efficiency. Exhaust downstream of a single stage of duct firing contains approximately 10-12% oxygen by volume. One reason for the inefficiency of the prior art turbines is that significant amounts of air are compressed not only for combustion process, but also as cooling air for the turbine combustor, vanes and turbine blades.

The invention relates to a multi-stage/high temperature duct-firing HRSG, which can utilize the remaining oxygen in the gas turbine exhaust down to less than 5%, and thereby increase the overall thermal efficiency significantly, e.g., at least 92%.

SUMMARY

In one aspect, embodiments disclosed herein relate to a Multi-Stage/High Temperature duct-fired heat recovery steam generator HRSG exhibiting increased efficiency and steam volume production as compared to other heat recovery steam generators.

In another aspect, the invention relates to a system to produce steam for a thermal enhanced oil recovery (EOR) operation using a heat recovery steam generator (HRSG) assembly. The system comprises: at least one feed water supply for providing water to be converted to steam; a gas turbine connected to an electrical generator producing electrical power, wherein the gas turbine generates exhaust gas at a temperature of at least 1000° F., and wherein the exhaust gas contains at least 10% oxygen as available oxygen; and a heat recovery steam generator (HRSG) assembly. The HRSG comprises: an exhaust duct configured to receive the exhaust gas from the gas turbine; at least two duct burners arranged in series that include a first duct burner and a subsequent duct burner, wherein each duct burner has a plurality of burner sections arranged in a generally vertical plane, and wherein at least one perforated plate is located upstream of the subsequent duct burner and configured to disperse and distribute available oxygen within the subsequent duct burner; at least a gas supply for providing gas having a calorific output of at least 1000 BTU/scf to the at least two duct burners and the gas turbine; a plurality of evaporators for transferring heat from the duct burners to the water to generate steam, wherein at least one evaporator corresponds to each of the duct burners, and wherein each at least one evaporator is arranged downstream from its corresponding duct burner relative to a flow of the exhaust gas; wherein the first duct burner is arranged in series with the subsequent duct burner relative to the flow of exhaust gas and is configured to receive the exhaust gas from the gas turbine, use available oxygen in the exhaust gas thereby reducing oxygen concentration, and pass exhaust gas having a reduced oxygen concentration relative to the exhaust gas from the gas turbine downstream relative to the at least one evaporator corresponding to the first duct burner and then to the subsequent duct burner in series; wherein the subsequent duct burner is configured to receive the exhaust gas having a reduced oxygen concentration after it has passed through the at least one evaporator corresponding to the first burner, further reduce oxygen concentration in the exhaust gas, pass exhaust gas having a further reduced oxygen concentration relative to the exhaust gas with a reduced oxygen concentration to the evaporator corresponding to the subsequent duct burner; wherein the plurality of evaporators are arranged in parallel with respect to a flow of feed water received from the at least one feed water supply; wherein the plurality of evaporators are configured to convert water into steam that has a steam quality of at least 65%; and wherein exhaust gas exiting the HRSG assembly contains oxygen in a range of 2% to 8%.

DETAILED DESCRIPTION

Figure 1:
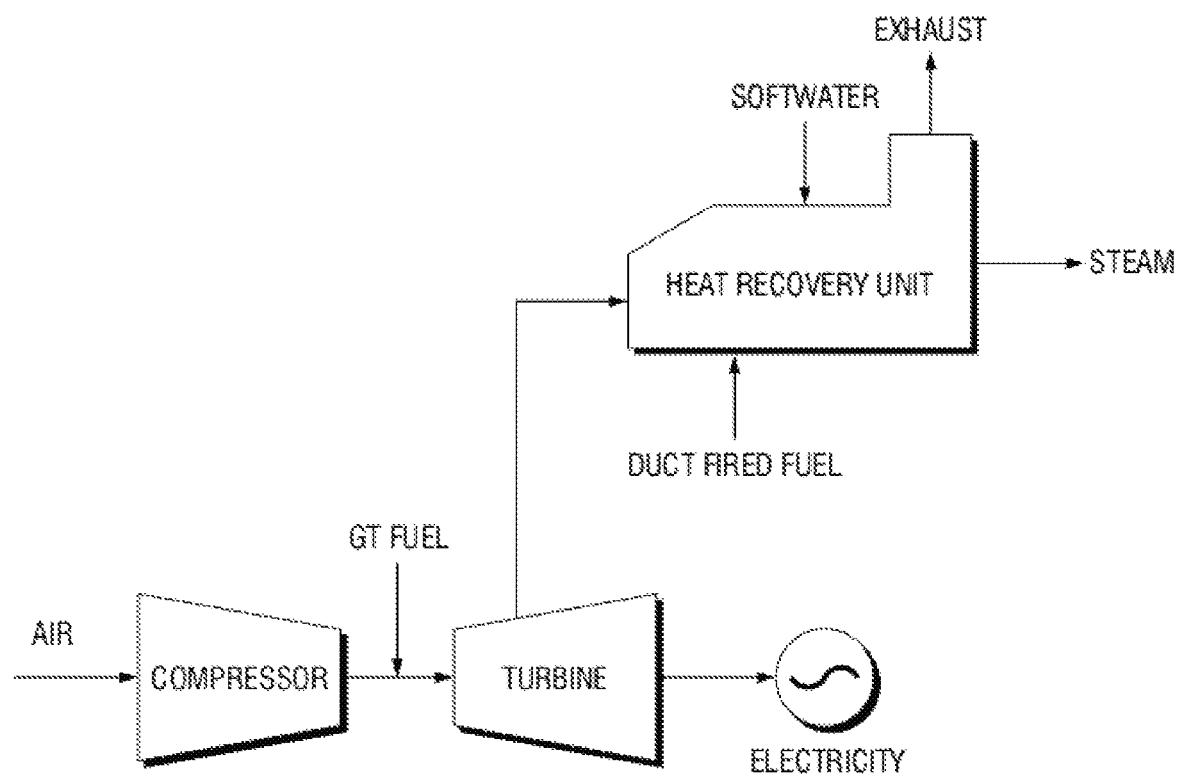
FIG. 1 illustrates a process flow diagram of a typical cogeneration (electric power and steam).

The following terms will be used throughout the specification and will have the following meanings unless otherwise indicated.

"HRSG" means heat recovery steam generator(s).

"Duct" refers to a conduit, e.g., for carrying the exhaust gas through the heat exchanger tubes of heat recovery steam generators (HRSG).

"Duct burner" refers to a supplemental burner assembly for HRSG's, with pipe (duct) sections that produce high flame temperature of about 1700° F. to 3000° F., including thermal radiation. In one embodiment, the duct burner is of a grid-style to reduce pressure drop and spread the heat out across the duct, comprising an array of fuel manifolds (e.g., openings in the form of nozzles or drilled orifices) to deliver fuel into the turbine exhaust stream of the HRSG. The fuel in one embodiment is directed through a distribution grid of vertical and horizontal sections. Duct burners are known in the art, e.g., disclosed in US Patent Publication No. US2014/0099591; U.S. Pat. Nos. 3,843,309; 6,453,852; and 3,830,620, incorporated herein by reference in their entirety.

"Multi-Stage," "multi stage" or "multi-staged" as used in conjunction with duct fired, duct burner or duct firing means having a plurality (at least two) duct burners in series in a HRSG.

"High Temperature" or "high temperature" when used in conjunction with duct burner or duct firing refers to having a gas temperature exhaust from any of the multi-stage duct burners at a temperature of at least 1600° F.

"Utility quality gas" refers to gas as available from sources such as utility companies, having a HHV (higher heating value) calorific range of at least 1000 BTU/scf, as opposed to low BTU sources, e.g., having a HHV calorific range of less than 900 Btu/scf.

The invention relates to a high efficiency multi-stage duct fired heat recovery steam generator (HRSG) to generate steam for use in thermal enhanced oil recovery (EOR) applications. The HRSG may be of any type, including natural circulation HRSGs, forced circulation HRSGs, or once-through HRSGs.

Once Through Steam Generator:

In one embodiment, the HRSG is equipped with high pressure and temperature tubing (in series or parallel configurations) to transfer heat from gas turbine exhaust and HRSG duct burners into steam, by heating the feed water in the high pressure and temperature tubing to a steam quality of at least 65%. The generated steam has a steam quality of at least 70% in a second embodiment, and at least 75% in a third embodiment.

The multi-staged duct fired HRSG has low turbine exhaust gas (TEG) oxygen level, e.g., less than 5% in one embodiment; less than 3% in a second embodiment; a range of 2% to 8% in a third embodiment. The multi-staged duct fired HRSG may be used in cogeneration or combined cycle applications or modes. In a cogeneration application, a compressor coupled to a turbine having a combustion chamber in between, generates an exhaust gas. The exhaust gas enters the power turbine and then the HRSG, where it is used to produce steam. The hot excess air has enough oxygen, e.g., 12 to 15% to support further combustion and increase the thermal efficiency of the process to make more steam with minimal amounts of fuel, since the air is already hot at $>=1000°$ F.

In the inventive multi-stage duct fired HRSG, the available hot oxygen is utilized down to 2% to 8% (e.g., 5% or less), for a significant increase in steam production significantly with very little additional utility fuel gas compared to a single-stage duct fired HRSG. In one embodiment, the thermal efficiency of the HRSG is increased to at least 92%. The thermal efficiency is maximized with the use of a plurality of duct burners of grid-style configuration arranged in series, with each duct burner located upstream of the corresponding evaporator/radiant section. In one embodiment, the feed water stream to the evaporators is split into a plurality of streams in parallel, one for each duct burner/evaporator section. The hot exhaust gas from the turbine (over 1000° F.) is directed to the duct burners in series, allowing further combustion and maximizing thermal efficiency.

Duct Burners:

The duct burners can be of the same or different configurations. In one embodiment, at least one of the duct burners has a rectangular cross-section and fits into the ductwork carrying the exhaust gases. In another embodiment, the duct burner can be of other shapes, e.g., circular shape. In yet another embodiment, the duct burner further includes vertical or horizontal fuel gas grids feeding fuel nozzles for heating the exhaust gas stream. In one embodiment, each duct burner is an assembly having a plurality of gas fired sections arranged in a generally vertical plane within a case. Each section includes a firing runner pipe that extends transversely through the casing. Each firing runner pipe defines a plurality of orifices that open or point generally in the direction of the gas turbine exhaust flow. The orifices are configured for discharge of the combustible gas, e.g., utility quality gas. Optionally in one embodiment, a flame stabilizer is provided so that when the combustible gas is ignited, the flame stabilizer allows the flame to be sustained generally along the runner pipe.

In certain embodiments, the duct burners may comprise a high-temperature material or cladding or coating to withstand high-temperature firing. The duct burners may be configured to add heat to the gas turbine exhaust stream.

The plurality of duct burners (supplemental burners) may be configured to burn a variety of different fuels from natural gas to oil. In one embodiment, the fuel is utility quality gas in a single duct, and without any supplemental air. The gas flow begins at the discharge end of the combustion turbine, flows in a single pass through various modules (e.g., duct burners and corresponding evaporators) in the HRSG and escapes to atmosphere through the stack. The exhaust gas is directed to the HRSG modules by its inlet duct.

Evaporator Sections:

The term evaporator may be used interchangeably with evaporator/radiant, as the "evaporator" on the steam side can be referred to as "radiant" on the combustion side. The multiple duct burners as used in the HRSG are capable of multi-stage/high temperature duct firing, with at least one burner for each evaporator section or stage. In certain embodiments, there may be two evaporator stages with a burner for each stage. In another embodiment, the HRSG has at least three duct burners and three evaporator sections.

The evaporators are heat exchangers, or any type of equipment built for efficient heat transfer from one medium to another. Evaporator sections are where the boiling process or steam generation occurs. As heat energy is absorbed by water from the gas stream, the water temperature increases. When water reaches the boiling point or saturation temperature, some of the water evaporates or vaporizes to steam. The evaporator sections can be any of single-pass, two- and three-row modules. The single pass is on the water side and is vertically up. The modules feed a steam/water mixture to the riser pipes. The modules are fed with water from the downcomer/feeder header assembly to replace the water exiting as a steam/water mixture.

Economizer:

In one embodiment, the HRSG may further include one or more economizers providing preheated water to the evaporators. Economizer is known in the art, which are heat exchange devices that heat fluids, usually water, up to but not normally beyond the boiling point of that fluid. In one embodiment, the economizer sections are composed of extended or finned tube surface modules. The economizer section includes multipass, three-row modules with required drains and vents. These modules are arranged in a series/parallel configuration to reach the desired final water temperature and capacity. Water flow rate control through the economizer is achieved through the drum level control instruments.

Feed Water Source:

The water for use in the HRSG can be any type of water, fresh water, waste water, recycled water or water recovered from oil & gas operations such as produced water. Produced water from oil recovery operations typically has relatively high concentrations of organics, silica, boron, hardness, suspended and dissolved solids. In one embodiment, a water treatment unit with one or more water softeners, walnut filters, ion exchange units, etc., is provided to purify the water as feed to the HRSG.

Methods of Operation:

Multi-stage duct firing may have any number of stages, with the turbine exhaust gas temperature showing an increase in temperature (after flowing through a duct burner), followed by a decrease in temperature (after heat transfer flowing through the evaporator section corresponding to the duct burner), followed by an increase in temperature (after the next duct burner in series), followed by a decrease in temperature (due to heat transfer to the corresponding evaporator section), so on and so forth in subsequent stages with a duct burner and corresponding evaporator section. For each stage of duct firing, there is a corresponding decrease in oxygen level of the exhaust gas, resulting in an oxygen level in the gas exhausting the stack of 5% or less, for example, depending on the number of stages.

The multi-stage duct firing may be configured to use substantially all available oxygen in said gas turbine exhaust gas thereby reducing said oxygen levels to below about 5%, below about 3%, or 2% to 8% in other embodiments. In certain embodiments, no supplemental air is provided to the combustion process to reduce oxygen levels in the gas turbine exhaust gas. In other embodiments, negligible amounts of supplemental air may be provided to the combustion process to reduce oxygen levels in the gas turbine exhaust gas. In one embodiment, the dispersion and distribution of available oxygen in the second and subsequent burners (downstream from the first one) is accomplished with the use of perforated plates.

In operation in one embodiment, the $1^{st}$ stage duct firing is heated to a temperature of at least 1700° F. After heat transfer to the plurality of evaporator tubes (evaporator section corresponding to the $1^{st}$ duct burner), the exhaust gas temperature is reduced, e.g., to 600° F. In the subsequent stage duct firing with the subsequent duct burner in series, the temperature is brought up, e.g., to at least 1500° F., or at least 1700° F. After the exhaust gas flows through the $2^{nd}$ corresponding evaporator section with a plurality of evaporator tubes, the temperature is brought back down to at least 800° F., or at least 500° F., or at least 600° F. In one embodiment, the gas turbine exhaust gas is heated in each of the subsequent duct burners to at least 1500° F., or at least 1700° F., or at least 2000° F., prior to the gas entering the evaporator section corresponding to the subsequent duct burner. The gas turbine exhaust then enters the economizer section where the gas turbine exhaust temperature is further reduced due to heat transfer.

The configuration of the duct burners and conditions can be effectively modeled using CFD (computational fluid dynamics). The CFD model can be carried out using methods known in the art, with variables including but not limited to duct geometry; nozzle location; distribution and sizes of the nozzle(s), distance between nozzles and evaporator(s), and distribution devices (if any such as perforated plates and/or baffles).

In one embodiment, the duct burners are configured using a commercially available software package, e.g., FLUENT™ model, DbCalc™ model, etc., to specify minimum duct dimensions and profile plate designs. CFD models may take into consideration certain variables and/or make certain assumptions regarding various variables including but not limited to flow rate of exhaust gas to the burner, minimum and maximum exhaust gas temperature to the burner, firing rate, burner head gas pressure range, burner head orientation (either horizontal or vertical parallel to exhaust gas flow), burner head configuration (straight, H or I arrangements), flame lengths, differential air pressure range (across the burner), exhaust gas velocity range to the burner, firing rates (as BTU/h).

Depending on the CFD model being utilized, the duct burner output configuration may include but is not limited to: heat input (BTU/h), burner length, minimum duct width and height, profile plate dimension, burner turndown (minimum achievable heat input), required pressure drop across the burner, and burner head gas pressure. In another embodiment, a CFD model is used using compressible flow relations for flow cross orifices in the duct burner to estimate jet penetration and mass flow rate from each jet of the duct burner, allowing optimizing the fuel feed pressure, fuel flow rate, metering hole size, flow rate of exhaust gas, and duct pressure. In another embodiment, the CFD model is used to optimize the metering hole size, number of holes, fuel feed pressure, fuel mass flow, energy flow rate, and maximum possible flow.

CFD modeling of HRSG systems under different scenarios, e.g., comparing dual duct firing (two duct burners in series) with HRSG systems under any of simple cycle, no duct firing, and a single duct burner shows that on the average, the thermal efficiency shows an increase of at least 50% over a simple cycle operation, at least 5% over no duct firing operation, and at least 3% over a single duct burner operation. In one embodiment of a thermal EOR operation, the use of a dual duct firing allows an increase in steam generation rate (as barrels of steam per day or BSPD) of at least 50% over a simple cycle system; at least 40% over a no duct firing system; and at least 20% over a single duct burner system.

Methods for CFD modeling are known in the art, for example, disclosed in International Journal of Energy Engineering (IJEE), June 2013, Vol. 3 Iss. 3, PP. 74-79 ("The CFD Modeling of Heat Recovery Steam Generator Inlet Duct" by Ameri et al.); and Master Thesis titled "CFD Modeling of Heat Recovery Steam Generator and its Components using Fluent" dated 2006, by Veera Venkata Sunil Kumar Vytl of University of Kentucky, included herein by reference in their entirety.

FIGURES

Reference will be made to the Figures, showing various embodiments of the invention.

FIG. 1 illustrates an exemplary cogeneration process flow diagram of a HRSG. Air is compressed in the Gas Turbine (GT) axial compressor, fuel is injected into the GT combustor, and power is generated in the GT Power Turbine which drives the gas turbine, and generates electricity. Gas turbine exhaust gas enters the heat recovery unit (HRSG) where the exhaust gas is used by the HRSG to convert the feed water and produce steam for various applications, including for example heavy oil thermal enhanced oil recovery (EOR) production where it is used to reduce viscosity of the heavy oil.

Figure 2:
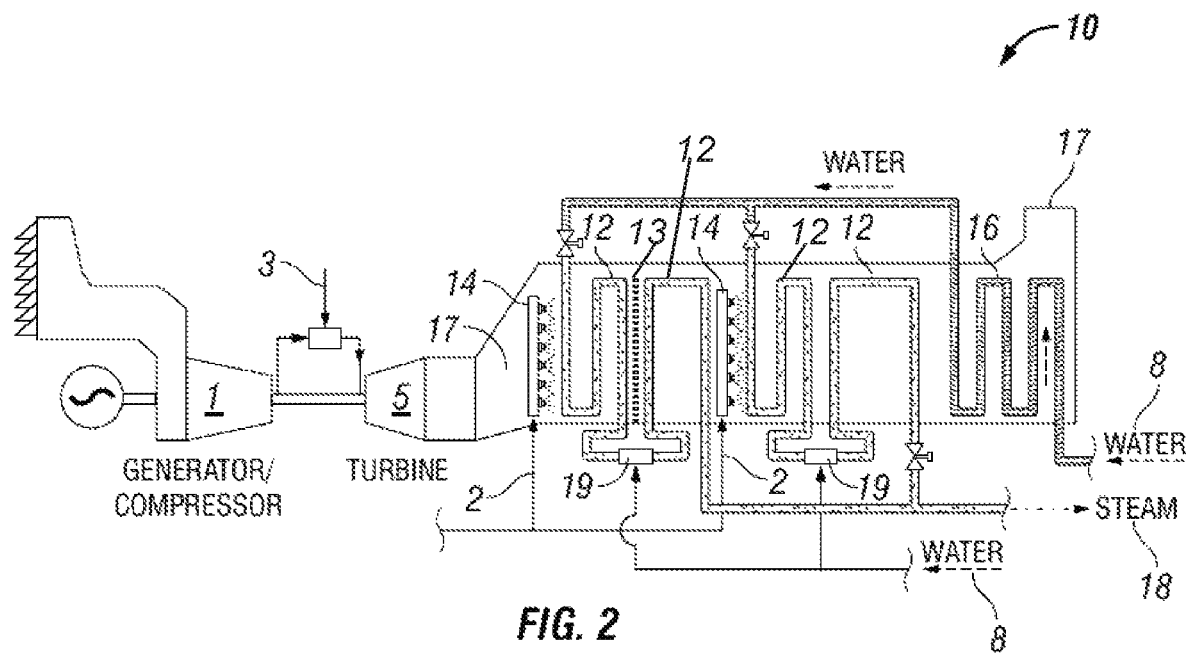
FIG. 2 illustrates an embodiment of a Multi-Stage/High Temperature duct-fired heat recovery steam generator with two (2) duct burners.

FIG. 2 illustrates an example embodiment of a Multi-Stage/High Temperature duct-fired heat recovery steam generator (HRSG) 10, which exhibits increased efficiency of at least 92% in producing greater steam volume. As illustrated, the shaft of the turbine 5 is connected to an electrical generator which then produces electrical power. The waste heat is recovered from the combustion turbine exhaust gas stream 17 by the HRSG, which is coupled to the gas turbine 5.

The HRSG 10 includes multiple evaporator/radiant sections 12, configured as heat exchangers. The HRSG is also provided with a plurality of duct burners 14. Utility quality fuel 3 is provided to the gas turbine 5 and utility quality fuel 2 is provided to the duct burners 14. Each of duct burners 14 is located upstream of each of the corresponding evaporator/radiant section 12. The duct burners may be configured to add heat to the gas turbine exhaust stream received from the gas turbine 5, prior to the exhaust stream 17 entering the evaporator sections 12. Exhaust gas 17 pressure drop across the duct burners 14 may be relatively low (e.g., ranging from 0.5 to 10 in. water column). The HRSG 10 includes an economizer section 16 providing preheated water to the evaporators 12. Water source 8 can be fresh water, recovered or treated produced water. In operation, energy is extracted from the heated exhaust stream 17 by the evaporator sections 12 to produce steam, which exits the HRSG 10 through steam pipe 18. In one embodiment as illustrated, the HRSG 10 is provided with attemporators 19 to control the generated steam temperature (with the use of water 8).

FIG. 2 also illustrates at least one perforated plate 13 to disperse and distribute available oxygen within the subsequent duct burner 14 (i.e., the second duct burner 14 in FIG. 2). As illustrated in FIG. 2, it is worth noting that the at least one perforated plate 13 is located downstream of the first duct burner 14 (and upstream of the subsequent duct burner 14) in order to disperse and distribute available oxygen within the subsequent duct burner 14 because there is residual oxygen after the first duct burner 14. Thus, the at least one perforated plate 13 is located upstream of the subsequent duct burner (i.e., the second duct burner 14 in FIG. 2) and configured to disperse and distribute available oxygen within the subsequent duct burner (i.e., the second duct burner 14 in FIG. 2).

As illustrated in FIG. 2, details for each configuration of the at least one perforated plate 13, including the number of perforated plates to utilize, the specification of each perforated plate (e.g., dimension of each perforated plate, thickness of each perforated plate, spacing and diameter of each perforation, etc.), may be determined in a design exercise for each gas turbine 5 and may be done via standard computational fluid dynamics (CFD) modeling. For example, the specification and number of perforations of a single perforated plate 13 may depend on the size of the gas turbine 5 and the CFD model. Additionally, the number of the perforated plates to utilize in the HRSG 10 may depend on the size of the gas turbine 5 and the CFD model, as well as the number of perforated plates that will cause the duct burners 14 to utilize oxygen level in the exhaust gas 17 down to 2% to 8%. In one embodiment, one or more perforated plates may be selected as needed for proper gas mixing to utilize (combust the remaining oxygen) as much of the hot exhaust gas as possible, considered complete when the oxygen content is down to 2% to 8%. Each perforated plate may be made of metal and should be able to withstand the temperatures that are present in the HRSG 10. The perforations may be round, square, slotted, hexagonal, designer, etc. as determined by the CFD model.

Those of ordinary skill in the art will appreciate that if a third duct burner were present in FIG. 2, then an additional perforated plate(s) 13 may be placed upstream of the third duct burner as described hereinabove, and so on. Indeed, perforated plates may be attached to the exhaust duct just upstream of the fuel nozzle manifold at each subsequent stage of duct firing. For example, perforated plate(s) could be added just upstream of the second duct firing fuel nozzles for dual duct-firing (FIG. 2), and the third duct firing fuel nozzles for tertiary duct firing, and the fourth duct firing fuel nozzles for quaternary duct firing, etc.

In one embodiment, the exhaust gas exiting the HRSG assembly contains less than 5% oxygen. In one embodiment, the exhaust gas exiting the HRSG assembly contains less than 3% oxygen. In one embodiment, the exhaust gas exiting the HRSG assembly contains oxygen in a range of 2% to 3%. In one embodiment, the exhaust gas exiting the HRSG assembly contains oxygen in a range of 2% to 4%. In one embodiment, the exhaust gas exiting the HRSG assembly contains oxygen in a range of 2% to 5%. In one embodiment, the exhaust gas exiting the HRSG assembly contains oxygen in a range of 2% to 6%. In one embodiment, the exhaust gas exiting the HRSG assembly contains oxygen in a range of 2% to 7%. In one embodiment, the exhaust gas exiting the HRSG assembly contains oxygen in a range of 2% to 8%. To be clear, those of ordinary skill in the art will appreciate that the oxygen mentioned in these ranges is elemental oxygen available for combustion.

Figure 3A:
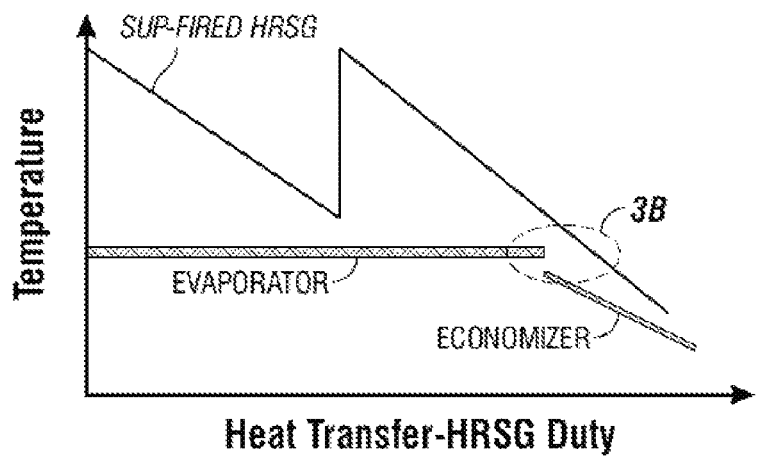
FIGS. 3A and 3B illustrate a thermal profile diagram associated with using the embodiment of the Multi-Stage/High Temperature HRSG shown in FIG. 2, with FIG. 3B is an exploded view showing the thermal profile at the pinch point.
Figure 3B:
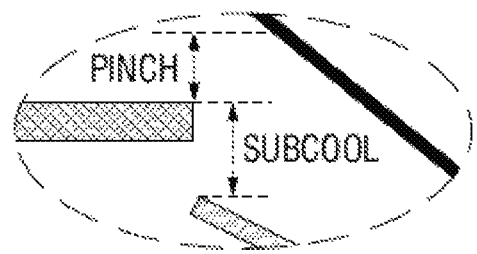

FIG. 3A is a graph illustrating a thermal profile diagram of the multi-stage duct firing operation with the HRSG shown in FIG. 2. FIG. 3B shows the thermal profile diagram taking into consideration of process temperature pinch points. Gas turbine exhaust at a certain temperature (e.g., >=1000 degrees F.) leaving the gas turbine enters the HRSG and is heated with the first duct burners to at least 1500° F., or at least 1700° F., or at least 2000° F., or at least 3000° F. The gas turbine exhaust is heated by the first duct burner prior to the gas entering the first evaporator section. Due to heat transfer with the first evaporator section, the gas turbine exhaust temperature decreases by a certain amount. For example, the temperature may decrease to at least 1000° F., or at least 600° F., or at least 500° F.

As shown, the $1^{st}$ stage duct firing heated to a temperature of at least 1700° F. After heat transfer to the plurality of evaporator tubes (evaporator section corresponding to the $1^{st}$ duct burner), the temperature is reduced, e.g., to 600° F. In the $2^{nd}$ stage duct firing with the subsequent duct burner in series, the temperature is brought up, e.g., to 1700° F. After the exhaust gas flows through the $2^{nd}$ corresponding evaporator section with a plurality of evaporator tubes, the temperature is brought back down to at least 800° F.

In one embodiment, the gas turbine exhaust gas is heated in the second duct burner to at least 1500° F., or at least 1700° F., or at least 2000° F., or at least 3000° F., prior to the gas entering the second evaporator section. Again, due to heat transfer with the second evaporator section, the gas turbine exhaust temperature again decreases by a certain amount. For example, the temperature may decrease to at least 1000° F., or at least 600° F., or at least 500 degrees F. The gas turbine exhaust then enters the economizer section where the gas turbine exhaust temperature is further reduced due to heat transfer.

Advantageously, embodiments disclosed herein are capable of reducing oxygen levels in the gas turbine exhaust down below a percentage (by volume) that greatly increases steam production efficiency and volume. Embodiments disclosed herein may be capable of providing thermal efficiencies of greater than 90%, in some cases up to 92%.

EXAMPLE

The following illustrative example is intended to be non-limiting.

Example 1

A CFD was carried out to model an industrial gas turbine (e.g., GE LM2500) implemented as part of a Multi-Stage High Temperature HRSG with three duct burners, one burner is upstream of the first tube bundle, and then two re-fire duct burners. Assumptions include 59° F./60% reheat, 0ft elevation; combustion of DLN 9 ppm NOx; the HRSG is single pressure once through sup-fired (1600° F.); stack conditions with 5% min. 02 and 180° F. minimum temperature; saturated steam at 1690 psig at 80% quality.

Table 1 shows basic performance calculations generated by the CFD model. The HRSG has outlet steam at 75% quality, having 2% to 8% oxygen in the exhaust to increase the thermal efficiency of the cogeneration, and minimize the number of conventional OTSG's, operating below the turbine exhaust temperature at each stage. The static head provided by the gas turbine is assumed to be 12.00 in-$H_2O$ for these performance runs. In the illustrative example, the exhaust gas is directed through a duct burner to get to the maximum temperature prior to passing over any steam generating surface. The exhaust gas passes through steam generating surface to bring its temperature back down to roughly the original exhaust temperature of the gas turbine. At this point, the exhaust gas would begin cycling between duct burners and the steam generating surface (e.g., the maximum temperature and the original exhaust temperature) until 2% $O_2$ is reached. At this point, the exhaust gas would pass through additional feedwater pre-heat generating surface (economizer) until it reaches the stack temperature. In the table, "duct fired" refers to the first duct burner prior to any steam generating surface. The stages refer to the reheating stages (starting with duct burner 2).

Example 2

A model of a HRSG using a GE Frame 7FA gas turbine (steam to power ratio ranging from 0.53 to 0.89) under different scenarios: simple cycle, no duct firing, a single duct burner, and dual duct firing (two duct burners in series) indicates that the thermal efficiency would be 38%, 84%, 88%, and 92% respectively, for corresponding steam generation rates of 0; 62,000; 98,000 and 164,000 BSPD (barrels of steam per day) respectively.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All citations referred herein are expressly incorporated herein by reference. It is to be expressly understood, however, that each of the figures is provided for the purpose of illustration and description only and is not intended as a definition of the limits of the present invention.

TABLE 1

| | | Gas Turbine Outlet Cond. | Duct-Fired (First Firing) | | Stage 1 (First Refiring) | | Stage 2 (Second Refiring) | | Total Outlet Cond. |
|---|---|---|---|---|---|---|---|---|---|
| | | | Once through Boiler | Economizer | Once through Boiler | Economizer | Once through Boiler | Economizer | |
| PERFORMANCE OUTPUT: | | | | | | | | | |
| Duty | MMBtu/hr | | 91.67 | 70.40 | 95.02 | 72.97 | 167.86 | 129.69 | 627.61 |
| Steam Produced | lb/hr | | 178,000 | | 184,500 | | 326,750 | | 689,250 |
| Water Inlet Temp | ° F. | | 523.9 | 150.0 | 523.9 | 150.0 | 525.0 | 150.0 | 150.0 |
| Water Outlet Temp | ° F. | | 561.8 | 523.9 | 561.8 | 523.9 | 561.8 | 525.0 | 561.8 |
| Supplementary Fuel Rate | lb/hr | 13,580.7 | 7,775.7 | | 8,061.7 | | 7,146.2 | | 36,564.3 |
| Flue Gas Flow Rate | lb/hr | 715,680 | 723,456 | | 731,518 | | 738,664 | | 738,664 |
| Flue Gas Inlet Temp | ° F. | 59.0 | 1750.7 | 1324.1 | 1749.7 | 1324.1 | 1629.6 | 880.9 | |
| Flue Gas Outlet Temp | ° F. | 985.0 | 1324.1 | 985.0 | 1324.1 | 985.0 | 880.9 | 246.9 | 246.9 |
| FLUE GAS COMPOSITION (EXIT) | | | | | | | | | |
| Volume Fraction $N_2$ | % | 76.421% | 74.978% | | 73.538% | | 72.308% | | 72.308% |
| Volume Fraction $O_2$ | % | 13.495% | 9.463% | | 5.440% | | 2.001% | | 2.001% |
| Volume Fraction $CO_2$ | % | 3.361% | 5.186% | | 7.007% | | 8.564% | | 8.564% |
| Volume Fraction CO | % | 0.000% | 0.000% | | 0.000% | | 0.000% | | 0.000% |
| Volume Fraction $H_2O$ | % | 6.723% | 10.373% | | 14.014% | | 17.127% | | 17.127% |
| Volume Fraction $SO_2$ | % | 0.000% | 0.000% | | 0.000% | | 0.000% | | 0.000% |

What is claimed is:

1. A system to produce steam for a thermal enhanced oil recovery (EOR) operation, the system comprising:
   at least one feed water supply that provides water to be converted to steam; a gas turbine connected to an electrical generator that produces electrical power, wherein the gas turbine generates exhaust gas at a temperature of at least 1000° F., and wherein the exhaust gas contains at least 10% oxygen as available oxygen; and a heat recovery steam generator (HRSG) assembly comprising:
   an exhaust duct configured to receive the exhaust gas from the gas turbine;
   at least two duct burners arranged in series that include a first duct burner and a subsequent duct burner, wherein each duct burner has a plurality of burner sections arranged in a generally vertical plane, and wherein at least one perforated plate is located upstream of the subsequent duct burner and is configured to disperse and distribute available oxygen within the subsequent duct burner;
   at least a gas supply for providing gas having a calorific output of at least 1000 BTU/scf to the at least two duct burners and the gas turbine;
   a plurality of evaporators for transferring heat from the at least two duct burners to the water to generate steam, wherein at least one evaporator corresponds to each of the duct burners, and wherein each at least one evaporator is arranged downstream from its corresponding duct burner relative to a flow of the exhaust gas;
   wherein the first duct burner is arranged in series with the subsequent duct burner relative to the flow of exhaust gas and is configured to receive the exhaust gas from the gas turbine, use available oxygen in the exhaust gas thereby reducing oxygen concentration, and pass exhaust gas having a reduced oxygen concentration relative to the exhaust gas from the gas turbine downstream relative to the at least one evaporator corresponding to the first duct burner and then to the subsequent duct burner in series;
   wherein the subsequent duct burner is configured to receive the exhaust gas having a reduced oxygen concentration after it has passed through the at least one evaporator corresponding to the first burner, further reduce oxygen concentration in the exhaust gas, pass exhaust gas having a further reduced oxygen concentration relative to the exhaust gas with a reduced oxygen concentration to the evaporator corresponding to the subsequent duct burner;
   wherein the plurality of evaporators are arranged in parallel with respect to a flow of feed water received from the at least one feed water supply;
   wherein the plurality of evaporators are configured to convert water into steam that has a steam quality of at least 65%; and
   wherein exhaust gas exiting the HRSG assembly contains oxygen in a range of 2% to 8%.

2. The system of claim 1, wherein no supplemental air is provided to the HRSG assembly.

3. The system of claim 1, wherein the exhaust gas is heated by each of the plurality of duct burners to a temperature of at least 1600° F., and wherein the exhaust gas is used to heat water in each of the at least one evaporators that correspond to each duct burner.

4. The system of claim 3, wherein the exhaust gas has a reduced exhaust gas temperature of at least 800° F. after passing through each of the at least one evaporators.

5. The system of claim 1, wherein the exhaust gas is heated by each of the plurality of duct burners to a temperature of at least 1700° F., and wherein the exhaust gas is used to heat water in each of the at least one evaporators that correspond to each duct burner.

6. The system of claim 3, wherein the exhaust gas has a reduced exhaust gas temperature of at least 1000° F. after passing through each of the at least one evaporators.

7. The system of claim 1, further comprising a water softener unit for treating water before it is supplied to the HRSG assembly.

8. The system of claim 1, wherein the exhaust gas exiting the HRSG assembly contains less than 3% oxygen.

9. The system of claim 1, wherein the exhaust gas exiting the HRSG assembly contains oxygen in a range of 2% to 3%.

10. The system of claim 1, wherein the exhaust gas exiting the HRSG assembly contains oxygen in a range of 2% to 4%.

11. The system of claim 1, wherein the exhaust gas exiting the HRSG assembly contains oxygen in a range of 2% to 5%.

12. The system of claim 1, wherein the exhaust gas exiting the HRSG assembly contains oxygen in a range of 2% to 6%.

13. The system of claim 1, wherein the exhaust gas exiting the HRSG assembly contains oxygen in a range of 2% to 7%.

14. The system of claim 1, wherein the exhaust gas exiting the HRSG assembly contains less than 5% oxygen.

15. The system of claim 1, wherein the system has a thermal efficiency of at least 92%.

16. The system of claim 1, wherein at least one of the plurality of duct burners has a rectangular cross-section.

17. The system of claim 1, wherein the at least two duct burners fit into the exhaust duct.

18. The system of claim 1, wherein the at least two duct burners are provided with a plurality of nozzles for heating the exhaust gas and wherein the at least two duct burners are capable of being adjusted to work with gas turbines of different sizes.

19. The system of claim 18, wherein the at least two duct burners can be adjusted for the gas turbines of the different sizes by varying any of the following: size of the nozzles, number of nozzles, pressure of fuel supplied to the at least two duct burners, number of holes in the nozzles, size of holes in the nozzles, and flow rate of fuel supplied to the at least two duct burners.

20. A method to produce steam for a thermal enhanced oil recovery (EOR) operation, the method comprising:
   providing at least one feed water supply that provides water to be converted to steam;
   providing a gas turbine connected to an electrical generator that produces electrical power, wherein the gas turbine generates exhaust gas at a temperature of at least 1000° F., and wherein the exhaust gas contains at least 10% oxygen as available oxygen; and
   providing a heat recovery steam generator (HRSG) assembly comprising:
   an exhaust duct configured to receive the exhaust gas from the gas turbine;
   at least two duct burners arranged in series that includes a first duct burner and a subsequent duct burner, wherein each duct burner has a plurality of burner sections arranged in a generally vertical plane, and wherein at least one perforated plate is located upstream of the subsequent duct burner and is configured to disperse and distribute available oxygen within the subsequent duct burner;

at least a gas supply for providing gas having a calorific output of at least 1000 BTU/scf to the at least two duct burners and the gas turbine;

a plurality of evaporators for transferring heat from the at least two duct burners to the water to generate steam, wherein at least one evaporator corresponds to each of the duct burners, and wherein each at least one evaporator is arranged downstream from its corresponding duct burner relative to a flow of the exhaust gas;

wherein the first duct burner is arranged in series with the subsequent duct burner relative to the flow of exhaust gas and is configured to receive the exhaust gas from the gas turbine, use available oxygen in the exhaust gas thereby reducing oxygen concentration, and pass exhaust gas having a reduced oxygen concentration relative to the exhaust gas from the gas turbine downstream relative to the at least one evaporator corresponding to the first duct burner and then to the subsequent duct burner in series;

wherein the subsequent duct burner is configured to receive the exhaust gas having a reduced oxygen concentration after it has passed through the at least one evaporator corresponding to the first burner, further reduce oxygen concentration in the exhaust gas, pass exhaust gas having a further reduced oxygen concentration relative to the exhaust gas with a reduced oxygen concentration to the evaporator corresponding to the subsequent duct burner;

wherein the plurality of evaporators are arranged in parallel with respect to a flow of feed water received from the at least one feed water supply;

wherein the plurality of evaporators are configured to convert water into steam that has a steam quality of at least 65%; and wherein exhaust gas exiting the HRSG assembly contains oxygen in a range of 2% to 8%; and operating the HRSG assembly to generate steam from the at least one feed water supply.

* * * * *